3,002,842
INFRARED-TRANSMITTING ANTIMONY SULFIDE GLASS

George D. Kelly, Golden, Colo., assignor to the United States of America as represented by the Secretary of the Air Force
No Drawing. Filed Sept. 4, 1959, Ser. No. 838,370
7 Claims. (Cl. 106—47)

This invention relates to glasses that transmit infrared energy and more particularly to glasses in the system $K_2O$—$Sb_2O_3$ and $Sb_2S_3$.

A background that provides an understanding of the invention that is disclosed herein, as claimed, is provided by an article entitled Infrared-Transmitting Glasses in the System $K_2O$—$Sb_2O_3$—$Sb_2S_3$ by Barnham W. King and George D. Kelly at pages 367 to 371, inclusive, in the September 1958 issue of the Journal of the American Ceramic Society, volume 41, Number 9.

A brief summary of the invention follows, indicating its nature and substance together with a statement of the objects of the invention commensurate and consistent with the invention as claimed and also setting out the exact nature, the operation and the essence of the invention complete with proportions and techniques that are necessary with its use. The purpose of the invention also is stipulated. The presentation is adequate for any person who is skilled in the art and science to which the invention pertains to use it without involving extensive experimentation. The best mode of carrying out the invention is presented by the citing of a specific operative example inclusive of the preparation and the use of at least one example of the invention.

This invention has for its object the location of improved materials that are transparent to infrared.

The search for materials that are transparent to infrared radiation has led to the exploration of the system $K_2O$—$Sb_2O_3$—$Sb_2S_3$. Representative raw materials used were potassium pyroantimonate, potassium hydroxide, potassium nitrate, antimony oxide and antimony trisulfide. The raw materials were mixed and then liquefied in an atmosphere of air and of argon and then cooled to room temperature.

A raw mix was made that consisted by weight of from 50 to 5% of potassium pyroantimonate of the composition $K_2H_2Sb_2O_7 \cdot 4H_2O$ with from 50 to 95 weight percent $Sb_2S_3$ in glazed porcelain crucibles. The mix was melted in an argon atmosphere at 870° C. in an electric tube furnace. The molten mix was cooled in the cold zone of the furnace tube. The material so made was found to contain an immiscible crystalline phase that was light pink in color. The least crystalline material appeared at a 85% $Sb_2S_3$ content. The glass otherwise was black in color and opaque to visible light except in thin sections, which were dark red.

The potassium pyroantimonate $K_2H_2Sb_2O_7 \cdot 4H_2O$ may, if preferred be calcined at 700° C. for one hour. The $Sb_2S_3$ may be fused at 788° C. for 10 minutes in porcelain crucibles, if preferred. An illustrative raw batch had as constituents by weight 9% calcined potassium pyroantimonate and 91% antimony sulfide. Another initial batch consisted of by weight 92% $Sb_2S_3$ with 6% $Sb_2O_3$ and 2% $K_2O$. The mix was melted in air and the product analyzed 74% $Sb_2S_3$, 24% $Sb_2O_3$ and 2% $K_2O$.

This invention is the fruit of the above described experimental work and briefly comprises infrared transparent bodies of the system $K_2O$—$Sb_2O_3$—$Sb_2S_3$ within the composition limits:

| Calculated oxide or sulfide: | Parts by weight |
|---|---|
| $K_2O$ | 1 to 10 |
| $Sb_2O_3$ | 2 to 20 |
| $Sb_2S_3$ | 75 to 97 |

The infrared transparent bodies contemplated hereby are made from the raw materials mixed in their theoretical proportionate parts:

Potassium pyroantimonate
Potassium carbonate
Potassium hydroxide
Potassium nitrate
Antimony oxide and
Antimony trisulfide The dry, powdered materials are mixed together and are melted in glazed porcelain crucibles in an air atmosphere at 790° C. The molten mix is cast into discs or the like. The discs are crushed and the pink to white crystalline phase is removed. The resulting glass is remelted in the air atmosphere at 815° C. and is cast into discs, domes and the like for use in the transmission of infrared light.

Specimens of thicknesses of 5 to 7 mm. are buried in potter's flint to effect slow cooling or are annealed at 150° C. for 30 minutes. The resulting specimens are capable of infrared transmissions of 42% over the range of from 2 to 7 microns.

The material of which the specimens are made softens at about 230° C. It has a coefficient of linear thermal expansion, as increase in length per unit length measured over the temperature range of from 24° C. to 200° C., of $20 \times 10^{-6}$ per degree C. It has a specific gravity of 3.94 and has a modulus of elasticity of $5 \times 10^6$ lb. per square inch. It has a Knoop hardness of 135 and is highly resistant to attack by atmospheric moisture.

The pink-white crystalline material that separates during the preparation of the glasses and that is immiscible in the mix, probably consists of potassium acid oxalate $KHC_2O_4$, potassium acid sulfate $KHSO_4$ and a small amount of hydrated potassium tetrathionate $K_2S_4O_6 \cdot xH_2O$.

The compositions studied resulted in the conclusion that the highest infrared transmission and minimum devitrification had the composition of by weight 91.4% $Sb_2S_3$; 6.7% $Sb_2O_3$; and 1.9% $K_2O$. This glass was held melted for 15 minutes at 815° C.

An investigation of the effect of annealing on infrared transmission developed that the best annealing temperature for both the relief of strain and the development of infrared transmission is about 150° C. for 30 minutes.

The $K_2O$ source from KOH and from $KNO_3$ was studied and the use of KOH appeared to be advantageous in providing consistent results. The composition having the highest average transmission of infrared radiation contained by weight $Sb_2S_3$ 92%; $Sb_2O_3$ 6% and $K_2O$ 2%. This product was determined to be quite resistant to atmospheric deterioration. Infrared transmission was highest for glasses containing about 4.0 weight percent $K_2O$.

The glasses are quite easily worked. The granulated prefused material is cast into an iron mold that has been preheated to 100° C. Devitrification or change by heat and fusion from a glassy substance to a crystalline condition in the interior of the disc is to be avoided by the aforesaid preheating of the iron mold to about 100° C. to control the heat loss by the granulated prefused material cast into the iron mold since the devitrification of the material in the interior of the disc results in a decrease in infrared transmission.

Glass formation in the system $K_2O$—$Sb_2O_3$—$Sb_2S_3$ may be accomplished by melting in air and casting. The glass so produced transmits infrared to about 8 mu or microns and are most transparent in the range from 3½ to 6 mu. They have good resistance to atmospheric attack.

It is to be understood that the process and the product that are disclosed herein are experimentally successful results and that modifications in both the process and in the product may be made without departing from the scope of the present invention.

I claim:

1. The infrared transparent glass in the system $K_2O$—$Sb_2O_3$—$Sb_2S_3$ consisting essentially of a composition within the range limits by weight of from 1 to 10 parts $K_2O$; from 2 to 20 parts $Sb_2O_3$; and from 75 to 97 parts $Sb_2S_3$.

2. The glass defined by the above claim 1 that is characterized in thicknesses of from 5 to 7 millimeters by infrared transmissions of about 42% over the range of from 2 to 7 microns.

3. The glass in the system $K_2O$—$Sb_2O_3$—$Sb_2S_3$ that is defined in the above claim 1 and that is transparent to infrared radiations over the range of from 2 to 7 microns and that has as physical properties a coefficient of linear thermal expansion as increase in length per unit length measured over the temperature range of from 24° C. to 200° C. of $20 \times 10^{-6}$ per degree centigrade; modulus of elasticity of $5 \times 10^6$ pounds per square inch; a Knoop hardness of 135; and that softens at 230° C.

4. The infrared transparent glass consisting essentially of the composition of by weight 91.4% $Sb_2S_3$, 6.7% $Sb_2O_3$, and 1.9% $K_2O$.

5. The process of making an infrared transparent glass of the system $K_2O$—$Sb_2O_3$—$Sb_2S_3$ consisting essentially of the composition in the range of by weight from 1 to 10 parts $K_2O$ from 2 to 20 parts $Sb_2O_3$, and from 75 to 97 parts $Sb_2S_3$, by mixing under laboratory conditions of temperature and pressure proportionate parts of the raw batch constituents illustratively selected from the compound group of potassium pyroantimonate about from 5 to 50%, potassium carbonate, potassium hydroxide, potassium nitrate, antimony oxide, and antimony trisulfide about from 50 to 95%; melting the mix at about 790° C.; casting the molten mix; crushing the cast mix; removing from the crushed mix a pink to white crystalline phase to provide a resulting glass at about 815° C. for 15 minutes in an air atmosphere; remelting the resulting glass; casting the remelted glass; and annealing the cast glass at 150° C. for 30 minutes.

6. The process of making an infrared transparent glass of the system $K_2O$—$Sb_2O_3$—$Sb_2S_3$ consisting essentially of the composition within the range of by weight from 1 to 10 parts $K_2O$, from 2 to 20 parts $Sb_2O_3$, and from 75 to 97 parts $Sb_2S_3$ by mixing under laboratory conditions of temperature and pressure proportionate parts of the raw batch constituents illustratively of potassium pyroantimonate about from 5 to 50%, potassium carbonate, potassium hydroxide, antimony oxide and antimony trisulfide about from 50 to 95%; charging a glazed porcelain crucible with the mix, melting the mix in the crucible in an air atmosphere and at the temperature of about 790° C.; casting the molten mix; crushing the cast mix; removing most of the pink to white crystalline phase from the crushed cast mix to leave a resulting glass; charging a glazed porcelain crucible with the resulting glass; melting the resulting glass in an air atmosphere at about 815° C. for 15 minutes; and casting the molten resulting glass in a preheated mold.

7. The process of making an infrared transparent glass consisting essentially of about by weight 92% $Sb_2S_3$, 6% $Sb_2O_3$ and 2% $K_2O$ by mixing under laboratory conditions proportionate parts of the raw batch constituents illustratively of potassium pyroantimonate about from 5 to 50%, potassium carbonate, potassium hydroxide, antimony oxide and antimony trisulfide about from 50 to 95%; charging the mix into a crucible that is chemically inert to the mix; melting the mix at 790° C.; casting the mix; crushing the cast mix; removing a pink-white crystalline phase from the crushed mix to provide the resultant glass of the composition by weight of 92% $S_2bS_3$, 6% $Sb_2O_3$ and 2% $K_2O$; charging the resultant glass into a crucible that is substantially inert thereto; melting in an air atmosphere the resultant glass at 815° C. and holding the glass at 815° C. for at least 15 minutes; casting the glass into a mold that is preheated to 100° C.; and annealing the cast glass at 150° C. for 30 minutes.

References Cited in the file of this patent

UNITED STATES PATENTS 2,503,140    Stookey    Apr. 4, 1950

FOREIGN PATENTS 569,389    Canada    Jan. 20, 1959